United States Patent [19]

Bolton et al.

[11] Patent Number: 5,374,351
[45] Date of Patent: Dec. 20, 1994

[54] FILTER BACKFLUSHING SYSTEM

[75] Inventors: Joseph A. Bolton, Queensbury; Peter T. Carstensen, Adirondack, both of N.Y.

[73] Assignee: D & J Filtration Systems, Queensbury, N.Y.

[21] Appl. No.: 97,551

[22] Filed: Jul. 27, 1993

[51] Int. Cl.⁵ ............................ B01D 24/48
[52] U.S. Cl. ............................ 210/97; 210/106; 210/108; 210/136; 210/258; 210/393; 210/411; 210/412; 210/DIG. 5
[58] Field of Search ........... 210/97, 106, 108, 136, 210/DIG. 5, 258, 393, 411, 412

[56] References Cited

U.S. PATENT DOCUMENTS

| | | |
|---|---|---|
| 2,338,419 | 1/1944 | Forrest et al. . |
| 3,029,948 | 4/1962 | McKay . |
| 3,221,888 | 12/1965 | Muller . |
| 3,365,065 | 1/1968 | Varjabedian . |
| 3,389,797 | 6/1968 | Giardini . |
| 3,425,557 | 2/1969 | Rosaen . |
| 3,425,558 | 2/1969 | Rosaen . |
| 3,542,197 | 11/1970 | Rosaen . |
| 3,554,380 | 1/1971 | Karpacheva et al. . |
| 3,870,638 | 3/1975 | Karpacheva et al. . |
| 4,055,500 | 10/1977 | Parker . |
| 4,156,651 | 5/1979 | Mehoudar . |
| 4,642,188 | 2/1987 | De Visser et al. ............. 210/411 |
| 4,648,971 | 3/1987 | Pabst . |
| 4,708,801 | 11/1987 | Galaj . |
| 4,770,771 | 9/1988 | Buckminster . |
| 4,776,962 | 10/1988 | Wakeman ............. 210/411 |
| 4,861,498 | 8/1989 | Robinsky . |
| 5,141,631 | 8/1992 | Whitman . |

Primary Examiner—Robert A. Dawson
Assistant Examiner—W. L. Walker
Attorney, Agent, or Firm—Schmeiser, Morelle & Watts

[57] ABSTRACT

A filter backflushing system including either a pneumatically-driven piston or pneumatic accumulator for propelling a supply of a filtered backflushing fluid, contained in a backflushing fluid chamber, in a reverse direction through a filter element. The filter backflushing system provides a high intensity, substantially instantaneous, constant pressure backflushing flow which effectively removes clogging contaminants from the filter element.

18 Claims, 3 Drawing Sheets

FILTER BACKFLUSHING SYSTEM

FIELD OF THE INVENTION

The present invention relates to a filtering system and, more particularly, to a filter backflushing system for removing contaminants from a filter element. The backflushing system includes a backflushing fluid chamber incorporating a piston, air chamber or accumulator therein for providing a high intensity, substantially instantaneous, constant pressure reverse flow through the filter element.

BACKGROUND OF THE INVENTION

A filtered supply of a coolant, lubricant, fuel, water or other fluid is oftentimes essential for the proper operation and maintenance of a plethora of industrial, automotive and commercial systems. Unfortunately, the filter elements utilized to filter such fluids must be periodically replaced or cleansed to remove a clogging accumulation of contaminants and foreign matter therefrom.

The periodic removal and replacement of a clogged filter element generally requires the shutting down of an associated system during the replacement procedure. The expensive, nonproductive downtime of the system, the replacement cost of the filter element and the expenses incurred to properly dispose of the soiled filter element and the contents thereof in accordance with the ever increasing degree of governmental and environmental mandates, have led to the development of numerous in situ filter element cleansing systems.

One such system, generally termed backflushing or backwashing, generates a reverse flow of fluid through individual filter elements to dislodge the contaminants therefrom, wherein the backflushing fluid has been filtered by multiple filters. Advantageously, backflushing reduces the operational cost of a filtering system by extending the usable life of the filter elements, by reducing the system downtime required to replace filter elements and by reducing disposal costs. Notwithstanding the above-described advantages, currently available backflushing systems are not capable of producing a reverse flow of fluid having sufficient flow rate, velocity and pressure drop to remove substantially all of the contaminants from a filter element, especially when the fluid is highly viscous or has a high solid content and the filter elements have fine filtration ratings of 40 microns or less.

SUMMARY OF THE INVENTION

In order to avoid the disadvantages of the prior art, the present invention provides a filter backflushing system having a piston, air chamber or accumulator for providing a short duration, high intensity, constant pressure reverse backflushing flow through a filter element.

The filter backflushing system of the present invention generally includes a filter housing for enclosing a removable filter element, a valve controlled feed pipe for introducing an unfiltered fluid into the filter housing, an output feed pipe for removing filtered fluid from the filter housing, a valve-controlled drain output for removing backflushing fluid from the filter housing, a backflushing fluid chamber for receiving the filtered fluid from the output feed pipe, a backflushing actuator such as a pneumatically-driven piston or the like for reversing the flow of fluid through the filter element by propelling the filtered fluid contained within the backflushing fluid chamber therethrough, a valve-controlled accepts port for removing the filtered fluid from the backflushing fluid chamber and a fluid pressure responsive system for initiating the backflushing operation.

In a first embodiment of the present invention, the fluid backflushing system incorporates a coalescing filter element for extracting oil from an oil and water mixture. As known in the art, coalescing filters are commonly utilized to separate oil or other liquids from water, although they may be utilized to separate any two liquids, as long as there is a difference in specific gravities and one liquid is much greater in volume than the other.

As the oil and water mixture passes through the very small pores of the coalescing filter element, fine droplets of oil collect on the outer surface thereof, thereby forming larger droplets of oil. The minimal turbulence within the filter housing and the low velocity of the oil droplets therein allow the droplets of oil to float upwards to the surface of the water, due to the difference in specific gravity of the two fluids, where they bleed out at a constant flow or are purged at intervals.

A coalescing filter element typically has a filtration rating of ten (10) microns or less. As such, the filter element is very susceptible to plugging. Generally, to reduce any operational clogging due to an accumulation of contaminants, one or more fine filter elements must be installed ahead of or in series with the coalescing filter element. When the coalescing filter does eventually becomes plugged, it must be replaced or backflushed as described above.

The present invention provides an improved filter backflushing system which is highly suited for effectively and efficiently removing contaminants from coalescing filters, although it may be incorporated into virtually any type of filtration system.

The coalescing filter backflushing system includes a filter housing for removably enclosing a coalescing filter element and a pneumatically-driven piston for propelling a quantity of filtered water, contained in a backflushing fluid chamber, in a reverse direction through the coalescing filter element.

The filter backflushing system further includes a feed pipe for introducing a supply of the oil and water mixture into the interior of the coalescing filter element, an oil removal system for collecting the oil which has floated to the surface of the filtered water within the filter housing after coalescing on the outer surface of the coalescing filter element during the filtration process, an output feed pipe for directing the filtered water from the filter housing into the backflushing fluid chamber and a drain output for removing backflushing fluid from the filter housing.

The backflushing fluid chamber includes a pneumatically-driven piston for propelling the filtered water stored therein through the coalescing filter element during a backflushing operation. Preferably, the volume of the backflushing fluid chamber is substantially equivalent to the volume of the filter housing, thus allowing the clean, filtered water contained within the backflushing fluid chamber to completely displace the fluid within the filter housing (filtered water and oil and water mixture) during the backflushing procedure, thereby removing substantially all of the flow reducing contaminants and foreign matter which have clogged the coalescing filter element. Further, the backflushing fluid chamber includes an input port proximate the bottom thereof for receiving the filtered water from the filter housing output feed pipe and an accepts port, extending from an upper portion of the chamber, for removing the filtered water from the backflushing filter system. Under normal operational conditions, the filtered water is adapted to flow through the filter housing output feed pipe, upwards through the backflushing fluid chamber, exiting through the accepts port.

The pneumatically-driven piston is adapted to provide a rapid, high intensity, constant pressure reverse flow through the coalescing filter element or a series of rapid, high intensity pulsations therethrough. In particular, the piston includes a pneumatic cylinder which extends upwardly through the top of the backflushing fluid chamber and a piston head, attached to the bottom of the pneumatic cylinder, which is disposed within the interior of the backflushing fluid chamber. Preferably, the diameter of the piston head is substantially equivalent to the interior diameter of the backflushing fluid chamber. In response to the application of an appropriate degree of air pressure to the pneumatic cylinder, the piston head is displaced rapidly downwards along the length of the backflushing fluid chamber, thereby propelling the filtered water contained within the chamber in a reverse direction through the filtering system.

The downward force of the piston produces a high, constant fluid pressure within the filter backflushing system which effectively backflushes the coalescing filter element, unlike the ineffectual backflushing systems of the prior art which utilize a large, inconsistent, low pressure reverse backflushing flow. Advantageously, the backflushing flow may be regulated in accordance with the requirements of the filter, the types of fluids flowing through the filtration system or other parameters. In particular, the backflushing flow intensity may be regulated by controlling the air pressure supplied to the pneumatic cylinder, by varying the piston stroke velocity, and/or by altering the relative diameters of the pneumatic cylinder, piston head and backflushing fluid chamber.

In accordance with the present invention, the coalescing filter element is adapted to be backflushed in response to a predetermined reduction of the flow of the oil and water mixture therethrough, although it may be backflushed at predetermined intervals. In particular, a differential pressure switch is provided for determining the relative fluid pressures between the oil and water mixture flowing into the filter housing through the feed pipe and the filtered water flowing out of the filter housing through the output feed pipe. When the difference between the fluid pressures reaches a predetermined threshold, the pneumatically-driven piston is forced downward within the backflushing fluid chamber, thereby forcing the filtered water stored within the chamber in a reverse direction through the coalescing filter element. Alternatively, a flowmeter or the like, for measuring the flow of filtered water through the output feed pipe or other appropriate location within the filtration system, may be utilized to determine a low flow condition and to initiate the backflushing operation.

The direction of fluid flow through the filter backflushing system of the present invention is ingeniously controlled by a plurality of suitably positioned pneumatic control valves. In particular, the feed pipe for inputting the oil and water mixture into the interior of the coalescing filter element, the accepts port for removing the filtered water from the filtration system and the drain output for removing backflushing fluid from the filter housing, each include a pneumatic control valve which is adapted to selectively shut off or enable the flow of fluid therethrough during the normal filtering and backflushing operation of the filter backflushing system.

During filtration, the feed pipe control valve is in an open state, thereby allowing the oil and water mixture to be separated by the coalescing filter element. The droplets of oil which form on the outer surface of the coalescing filter element float to the top of the filter housing where they are purged or discharged in a manner known in the art. The filtered water, having a higher specific gravity than the oil, enters the backflushing fluid chamber after passing through the output feed pipe disposed proximate the bottom of the filter housing. Further, by maintaining the drain output control valve and the accepts port control valve in a closed and open state respectively, the filtered water is adapted to flow out of the backflushing fluid chamber through the accepts port. This filtration process continues until the differential pressure switch is triggered in response to the clogging of the coalescing filter element, thereby initiating the filter backflushing operation.

The direction of fluid flow is reversed through the coalescing filter element during the backflushing operation. First, the accepts and feed pipe control valves are closed in rapid succession. Next, pressurized air is supplied to the top of the pneumatic cylinder, forcing the piston head downward in the backflushing fluid chamber, thereby pressurizing the filter backflushing system. The drain output control valve is then opened, allowing the backflushing fluid to be purged from the filter housing. Once the pneumatic cylinder reaches the end of its downward stroke, it is forced to its original position with a quantity of pressurized air. Finally, the drain output control valve is closed and the feed pipe and accepts port control valves are reopened, returning the filtration system to its normal filtering condition.

A valve controlled external supply of hot water, detergent, or other appropriate cleaning fluid may be utilized during the backflushing operation described above. In particular, the external fluid may be inputted into the backflushing fluid chamber through the filter housing output feed pipe, backflushing fluid chamber accepts port or other suitable location during the initial stages of the backflushing operation.

The filter backflushing system of the instant invention may be utilized to remove contaminants and foreign matter from a wide variety of filters. For example, in a second embodiment of the present invention, the backflushing system is utilized to cleanse an ultra fine filter element. Unlike the outward fluid flow utilized by the coalescing filter element described above, ultra fine filters require an inward fluid flow. As such, in the second embodiment, the unfiltered fluid is introduced directly into the filter housing rather than into the interior of the filter element. During the filtration process, the unfiltered fluid flows through the ultra fine filter to the interior thereof where it subsequently flows into the backflushing fluid chamber through an output feed pipe.

The filter backflushing system may utilize backflushing actuators other than the above-described pneumatically-driven piston, if they are capable of providing a high intensity, substantially instantaneous, constant pressure reverse flow through the filter element as required by the present invention. For example, an accumulator-type actuator may be utilized, in which compressed air is inputted directly into the backflushing fluid chamber to reverse the flow of fluid through the filter element. Alternatively, a piston propelled by a spring or other appropriate driving means may be incorporated into the present invention.

BRIEF DESCRIPTION OF THE DRAWINGS

These and other features of the present invention will become readily apparent upon reading the following detailed description of the invention in conjunction with the accompanying drawings, in which.

DETAILED DESCRIPTION OF THE INVENTION

Figure 1:
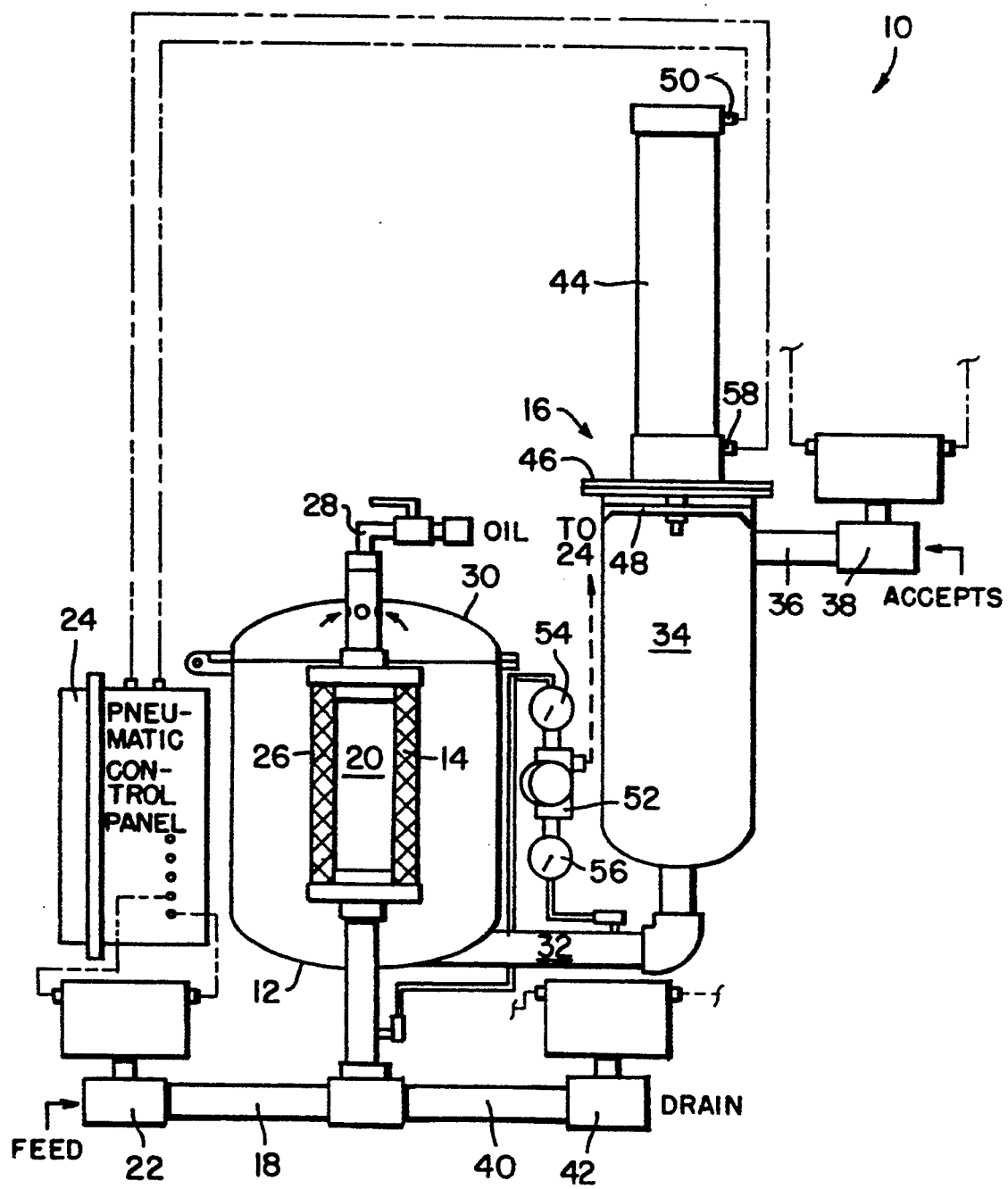
FIG. 1 is a coalescing filter backflushing system for filtering an oil and water mixture according to the present invention.

Referring now specifically to the drawings, there are illustrated several embodiments of the filter backflushing system according to the present invention, wherein like reference numerals refer to like parts throughout the drawings.

As illustrated in detail in FIG. 1, the coalescing filter backflushing system, generally designated as 10, includes a filter housing 12 with a removable coalescing filter element 14 enclosed therein and a pneumatically-driven piston 16 for creating a reverse flow through the filter element 14.

A feed pipe 18 is provided for introducing a supply of an oil and water mixture into the interior 20 of the coalescing filter element 14. A pneumatic valve 22 is utilized to shut off or enable the flow of the oil and water mixture through the feed pipe 18 in accordance with a supply of pressurized air provided by a pneumatic control panel 24. As the oil and water mixture passes through the coalescing filter element 14, droplets of oil float upwards toward the top of the filter housing 12, after forming on the exterior surface 26 of the filter element 14. An oil removal system 28, disposed on the pivotable cover 30 of the filter housing 12, is utilized to remove the separated oil from the filter housing.

The filtered water is adapted to flow out of the bottom of the filter housing 12, through an output feed pipe 32, into a backflushing fluid chamber 34. During normal filtration, an accepts port 36 is maintained in an open state by a pneumatic valve 38, thereby allowing the filtered water to flow out of the backflushing fluid chamber 34 where it is suitably discarded, recycled or otherwise utilized.

The pneumatically-driven piston 16 is adapted to propel the filtered water contained in the backflushing fluid chamber 34 through output feed pipe 32, into the filter housing 12 and through the coalescing filter element 14 in a reverse direction, wherein the backflushing fluid and the contaminants suspended therein which have been dislodged from the filter element flow out of the backflushing system through the drain output 40. Again, a pneumatic valve 42 is provided for controlling the flow of fluid through the drain port 40 in response to pressurized air supplied by the pneumatic control panel 24.

The pneumatically-driven piston 16 includes a pneumatic cylinder 44 which is slidably received through the top 46 of the backflushing fluid chamber 34 and a piston head 48 which is suitably secured to the bottom of the pneumatic cylinder and movably received within the backflushing fluid chamber. The piston head 48 is adapted to be displaced rapidly downwards within the backflushing fluid chamber 34 during a backflushing operation in response to the application of pressurized air, supplied by the pneumatic control panel 24, to an air input port 50 disposed proximate the top of the pneumatic cylinder 44, thereby driving the filtered water contained within the chamber 34 in a reverse direction through the coalescing filter element 14 and the drain port 40.

The backflushing operation is initiated in response to a predetermined reduction in the flow of the oil and water mixture through the coalescing filter element 14, as determined by a differential pressure switch 52. In particular, the differential pressure switch 52 includes a first flowmeter 54 for measuring the flow of the oil and water mixture entering the coalescing filter element 14 through the feed pipe 18 and a second flowmeter 56 for determining the flow of filtered water out of the filter housing 12 through the output feed pipe 32. When the relative fluid pressures reach a predetermined threshold, the differential pressure switch 52 is activated and a backflushing signal is subsequently relayed to the pneumatic control panel 24, thereby initiating the filter backflushing operation.

Pneumatic valves 22, 38 and 42 are adapted to provide the proper fluid paths through the filter backflushing system of the present invention in response to pressurized air supplied by the pneumatic control panel 24 during both normal filtration and the filter backflushing operation.

During filtration, pneumatic valves 22 and 38 are maintained in an open state while pneumatic valve 42 is closed, thereby creating a fluid path through feed pipe 18, coalescing filter element 14, output feed pipe 32, backflushing fluid chamber 34 and accepts port 36. The filtration fluid path is maintained until the differential pressure switch 52 is activated in response to the clogging of the coalescing filter element 14. Upon the activation of the differential pressure switch 52, the pneumatic control panel 24 initiates a backflushing sequence.

During the backflushing operation, the fluid flow through coalescing filter element 14 is reversed. In particular, upon the activation of the differential pressure switch 52, the pneumatic control panel 24 closes the accepts port pneumatic valve 38 and the feed pipe pneumatic valve 22 in rapid succession. Next, pressurized air is supplied by the pneumatic control panel 24 to air input port 50, disposed proximate the top of pneumatic cylinder 44, thereby rapidly driving the piston head 48 downwards through the backflushing fluid chamber 34 and pressurizing the filter backflushing system 10. Substantially instantaneously thereafter, the drain output pneumatic valve 42 is opened, allowing the filtered water previously contained within the backflushing fluid chamber 34 to flow rapidly through the coalescing filter element 14 in a reverse direction, where it is subsequently purged from the filter housing 12 through drain port 40 after dislodging the clogging contaminants from the filter element. After reaching the end of its downward stroke, the pneumatic cylinder 44 is returned to its original position in response to the application of pressurized air to the air input port 58.

Finally, the drain output pneumatic valve 42 is closed and the feed pipe and accepts port pneumatic valves 22, 38 are reopened, returning the filtration system to a filtering operation.

Figure 2:
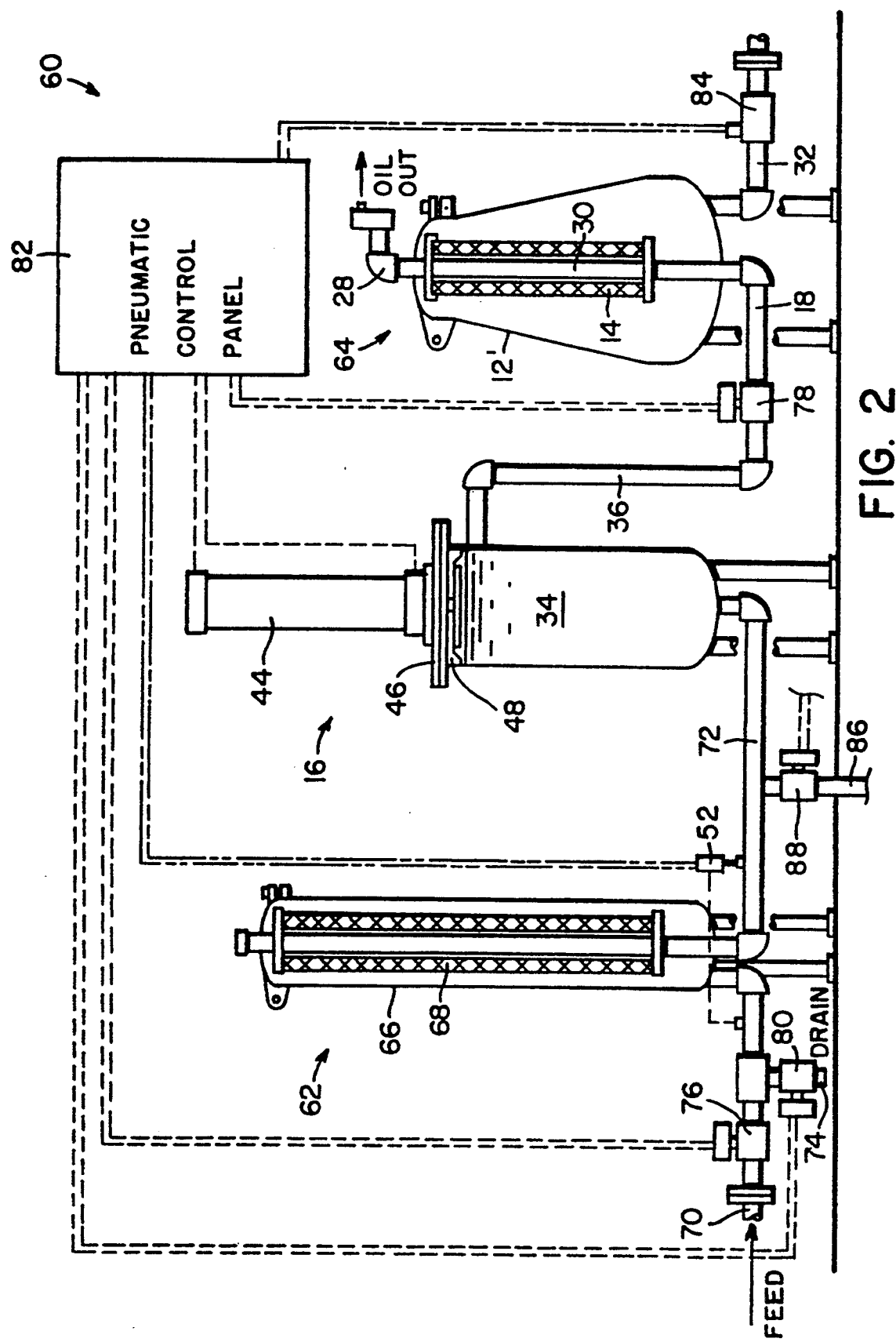
FIG. 2 illustrates a filter backflushing system having a fine pre-filtering system and a coalescing filtration system arranged in series.

Referring now specifically to FIG. 2, there is illustrated a filter backflushing system, generally designated as 60, having a fine pre-filtering system 62 for removing contaminants from an oil and water mixture and a coalescing filtration system 64 for separating the oil from the filtered oil and water mixture. A pneumatically-driven piston 16 is provided for propelling the filtered oil and water mixture contained in a backflushing fluid chamber 34 in a reverse direction through the fine pre-filtering system 62.

The fine pre-filtering system 62 includes a filter housing 66 for removably enclosing a fine pre-filter element 68, a feed pipe 70 for introducing the contaminated oil and water mixture into the filter housing 66, an output feed pipe 72 for removing the filtered oil and water mixture from the interior of the fine pre-filter element 68 and a drain port 74 for purging backflushing fluid from the filter housing. During normal filtration, the filtered oil and water mixture is adapted to flow from the interior of the fine pre-filter element 68 into the coalescing filtration system 64, through the backflushing fluid chamber 34.

As in the previously-described embodiment of the present invention, the coalescing filtration system 64 includes a filter housing 12' for enclosing a coalescing filter element 14, a feed pipe for directing the filtered oil and water mixture flowing out of the backflushing fluid chamber 34 into the interior 20 of the coalescing filter element 14, an oil removal system 28 for removing the separated oil from the filter housing and an output feed pipe 32 for removing filtered water from the filter housing. Advantageously, filter housing 12' is substantially pear-shaped, unlike the cylindrical configuration of filter housing 12. In particular, by forming the filter housing 12' in a substantially pear-shaped configuration, the turbulence and flow velocities within the filter housing are reduced, thereby facilitating the separation of the oil from the filtered oil and water mixture.

Again, as previously described, the pneumatically-driven piston 16 includes a pneumatic cylinder 44 which is slidably received through the top 46 of the backflushing fluid chamber 34 and a piston head 48 which is suitably secured to the bottom of the pneumatic cylinder and movably received within the backflushing fluid chamber. The piston head 48 is adapted to be displaced rapidly downwards within the backflushing fluid chamber 34 during a backflushing operation in response to the application of pressurized air, supplied by a pneumatic control panel 82, thereby driving the filtered oil and water mixture contained within the chamber 34 in a reverse direction through the fine pre-filter element 68 where it is purged through drain port 74.

A plurality of pneumatically operated ball valves 76, 78 and 80, each controlled by pressurized air supplied by the pneumatic control panel 82, are utilized to control the direction of fluid flow through the fine pre-filtering system.

During the filtering operation, the feed pipe ball valve 76 and the accepts port ball valve 78 are maintained in an open state and the drain port ball valve 80 is maintained in a closed state, thereby creating a fluid path which extends from feed pipe 70 to accepts port 32 through fine pre-filter element 68, backflushing fluid chamber 34 and coalescent filter element 14. This fluid path is maintained by the pneumatic control panel 82 until the differential pressure switch 52 is activated in response to the unacceptable clogging of the fine pre-filter element. Alternatively, or in conjunction with the differential pressure switch 52, an accepts port flowmeter 32 may be utilized to indicate a low flow condition.

In response to the activation of the differential pressure switch 52, the pneumatically-driven piston 16 is adapted to provide a high intensity, substantially instantaneous, constant pressure reverse flow through the fine pre-filter element 68. In particular, upon the activation of the differential pressure switch 52, the pneumatic control panel 82 closes the accepts port ball valve 78 and the feed pipe ball valve 76 in rapid order. Next, the piston head 48 is propelled rapidly downwards through the backflushing fluid chamber 34. Substantially immediately thereafter, the drain output ball valve 80 is opened, allowing the filtered oil and water mixture previously contained within the backflushing fluid chamber 34 to flow rapidly through the fine pre-filter element 68 in a reverse direction, where it is subsequently purged through the drain port 74 after dislodging the clogging contaminants from the filter element. After reaching the end of its downward stroke, the pneumatic cylinder 44 is returned to its original, upper position. Finally, the drain output ball valve 80 is closed and the feed pipe and accepts port pneumatic valves 76 and 78 are opened, initiating filtration.

In this embodiment of the invention, the filtration rating of the fine pre-filter element 68 is similar to the filtration rating of the coalescing filter element 14. As such, the fine pre-filter element is adapted to remove substantially all of the contaminants in the oil and water mixture, thereby reducing the resultant clogging of the coalescing filter element. However, if desired, a second backflushing system may be utilized to backflush the coalescing filter element. Further, a single, properly valved backflushing system may be utilized to simultaneously backflush both filter elements.

Under certain circumstances, it is often desirable to utilize an external supply of hot water, detergent, or other appropriate cleaning fluid during the backflushing operation described above. As further illustrated in FIG. 2, the present invention includes an external fluid supply 86 and an associated pneumatically operated ball valve 88, for inputting a fluid into the backflushing fluid chamber during the backflushing operation.

Figure 3:
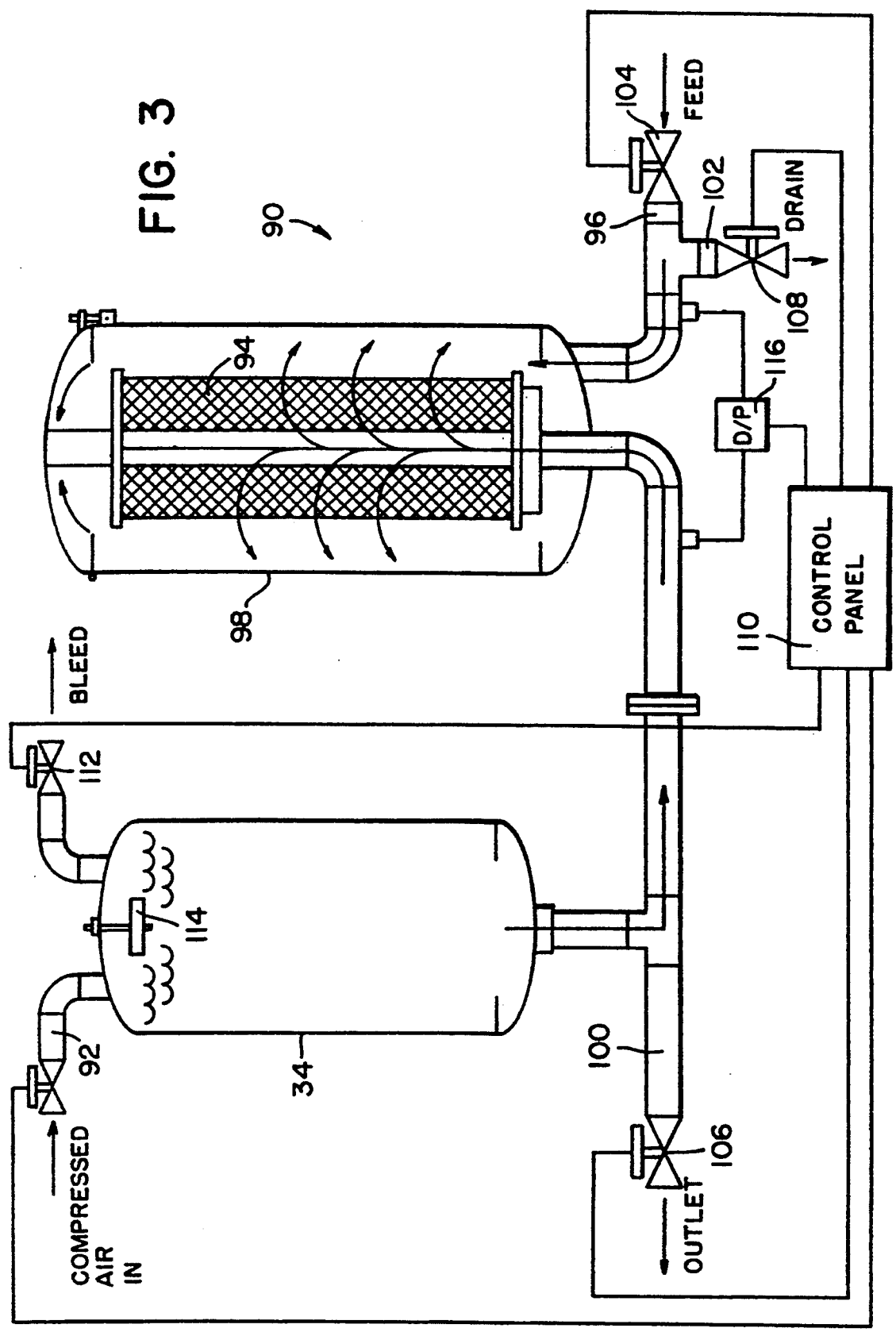
FIG. 3 illustrates a filtration system having a compressed air backflushing system.

Referring now to FIG. 3, there is illustrated a filter backflushing system, generally designated as 90, according to yet another embodiment of the present invention. More specifically, the filter backflushing system 90 utilizes a compressed gas, supplied through a compressed gas feed pipe 92, for propelling the filtered fluid contained in a backflushing fluid chamber 34 in a reverse direction through a filter element 94. Alternately, a piston may be utilized as described above to provide the reverse flow of fluid through the filter element.

The filter backflushing system 90 includes a feed pipe 96 for inputting a contaminated fluid into a filter housing 98, an outlet feed pipe 100 for removing filtered fluid from the filter backflushing system, a drain port 102 for purging backflushing fluid from the filter housing and a plurality of pneumatically controlled valves 104, 106 and 108, each actuated by a pneumatic control panel 110, for controlling the flow of fluid through the feed pipe, outlet feed pipe and drain port, respectively. During normal filtration, the drain valve 108 is maintained in a closed state and the feed and outlet valves 104, 106 are maintained in an open state, thereby creating a fluid flow path through the filter element 94 from the feed pipe 96 to the outlet feed pipe 100.

Prior to the initiation of the filter backflushing sequence and in response to the opening of a bleed valve 112, the backflushing fluid chamber 34 is filled with a supply of the filtered fluid exiting the filter housing 98. As illustrated, the bleed valve 112 is disposed proximate the top of the backflushing fluid chamber 34 and is actuated by the pneumatic control panel 110. The filtered fluid fills the backflushing fluid chamber 34 until the fluid level hits the a float switch 114, thereby closing the bleed valve 112.

A differential pressure switch 116 is provided for determining the differential pressure across the filter element 94, as measured between the input and output of the filter housing 98. When the differential pressure across the filter element reaches a predetermined maximum value, a backflushing operation is initiated.

During the initial stages of the backflushing operation, the outlet and feed valves 106, 104 are closed in rapid order. Next, approximately 70 to 140 psi of a compressed gas such as air or the like is delivered directly into the backflushing fluid chamber through the compressed gas feed pipe 92, thereby pressurizing the backflushing fluid system 90. Substantially simultaneously thereafter, drain valve 108 is opened, allowing the filtered fluid contained within the backflushing fluid chamber to flow rapidly through the filter element 94 in a reverse direction, where it is subsequently purged through the drain port 102 along with any contaminants dislodged from the filter element 94. Thereafter, in order to reinitiate filtration, the compressed gas feed pipe 92 and the drain valve 108 are closed and feed and outlet valves 104, 106 are reopened.

The foregoing description of the preferred embodiments of the invention has been presented for purposes of illustration and description. It is not intended to be exhaustive or to limit the invention to the precise form disclosed, and obviously many modifications and variations are possible in light of the above teaching. For example, the present invention may be utilized to sequentially backflush each of the individual filter units in a multiple filter system. Such modifications and variations that may be apparent to a person skilled in the art are intended to be included within the scope of this invention as defined by the accompanying claims.

I claim:

1. A filter backflushing apparatus comprising:
   a filtering system including a filter housing containing a filter member therein, said filtering system including an input feed for introducing an unfiltered fluid into said filter housing, an output feed for removing filtered fluid from said filter housing and a drain output for removing a backflushing fluid;
   a piston chamber having an input port for receiving the filtered fluid from the output feed of said filtering system, and a backflushing piston member for propelling the filtered fluid contained within said piston chamber through the output feed of said filtering system, into said filter housing, through said filter member and out through said drain output, thereby backflushing said filter member during a backflushing operation;
   input feed valve means for controlling the flow of said unfiltered fluid into said filter housing through said input feed;
   drain output valve means for controlling the removal of said backflushing fluid through said drain output;
   output feed valve means for controlling the flow of said filtered fluid out of said filter housing through said output feed; and
   means for sequencing the actuation of said piston member, said input feed valve means, said drain output valve means and said output feed valve means during a backflushing operation.

2. The filter backflushing apparatus according to claim 1 wherein, during said backflushing operation, said sequencing means is adapted to close said input feed valve means and said output feed valve means, said drain output valve means remaining in an open state.

3. The filter backflushing apparatus according to claim 1 wherein, during the normal operation of said filtering system, said sequencing means is adapted to close said drain output valve means, said input feed and said output feed valve means remaining in an open state.

4. The filter backflushing apparatus according to claim 1 wherein said sequencing means further includes means for initiating said backflushing operation.

5. The filter backflushing apparatus according to claim 4 wherein said backflushing operation initiating means includes means for monitoring the fluid flow through said filter member.

6. The filter backflushing apparatus according to claim 5 wherein said fluid flow monitoring means includes a differential pressure switching element, said differential pressure switching element including means for determining the relative pressures of the unfiltered fluid entering said filter member and the filtered fluid exiting said filter member.

7. The filter backflushing apparatus according to claim 1 wherein the volume of said piston chamber is substantially equivalent to the volume of said filter housing.

8. The filter backflushing apparatus according to claim 1 further including:
   means for displacing the piston member within said piston chamber.

9. The filter backflushing apparatus according to claim 8 wherein said displacing means includes a pneumatically actuated cylinder.

10. The filter backflushing apparatus according to claim 1 further including:
    means for providing said piston chamber with an external fluid source, wherein a fluid provided by said external fluid source is utilized during the backflushing operation.

11. A filter backflushing apparatus comprising:
    a filtering system including a filter housing containing a filter member therein, said filtering system including an input feed for introducing an unfiltered fluid into said filter housing, an output feed for removing filtered fluid from said filter housing and a drain output for removing a backflushing fluid;
    a backflushing fluid chamber having an input port for receiving the filtered fluid from the output feed of said filtering system;
    means for propelling the filtered fluid contained within said backflushing fluid chamber, during a backflushing operation, through the output feed of said filtering system, into said filter housing, through said filter member and out through said drain output, thereby backflushing said filter member;

input feed valve means for controlling the flow of said unfiltered fluid into said filter housing through said input feed;

drain output valve means for controlling the removal of said backflushing fluid through said drain output;

output feed valve means for controlling the flow of said filtered fluid out of said filter housing through said output feed; and means for sequencing the actuation of said propelling means, said input feed valve means, said drain output valve means and said output feed valve means during said backflushing operation.

12. The filter backflushing apparatus according to claim 11 wherein, during said backflushing operation, said sequencing means is adapted to close said input feed valve means and said output feed valve means, said drain output valve means remaining in an open state.

13. The filter backflushing apparatus according to claim 11 wherein, during the normal operation of said filtering system, said sequencing means is adapted to close said drain output valve means, said input feed and said output feed valve means remaining in an open state.

14. The filter backflushing apparatus according to claim 11 wherein said sequencing means further includes means for initiating said backflushing operation.

15. The filter backflushing apparatus according to claim 14 wherein said backflushing operation initiating means includes means for monitoring the fluid flow through said filter member.

16. The filter backflushing apparatus according to claim 11 wherein the volume of said backflushing fluid chamber is substantially equivalent to the volume of said filter housing.

17. The filter backflushing apparatus according to claim 11 further including:

means for providing said backflushing fluid chamber with an external fluid source, wherein a fluid provided by said external fluid source is utilized during the backflushing operation.

18. A filter backflushing apparatus comprising:

a filtering system including a filter housing containing a filter member therein, said filtering system including an input feed for introducing an unfiltered fluid into said filter housing, an output feed for removing filtered fluid from said filter housing and a drain output for removing a backflushing fluid;

a backflushing fluid chamber having an input port for receiving the filtered fluid from the output feed of said filtering system; and means for inputting a compressed gas into said backflushing fluid chamber during a backflushing operation, said compressed gas propelling the filtered fluid contained within said backflushing fluid chamber in a reverse direction through said filter member, said fluid exiting through said drain output as said backflushing fluid.

* * * * *